United States Patent Office 3,395,208
Patented July 30, 1968

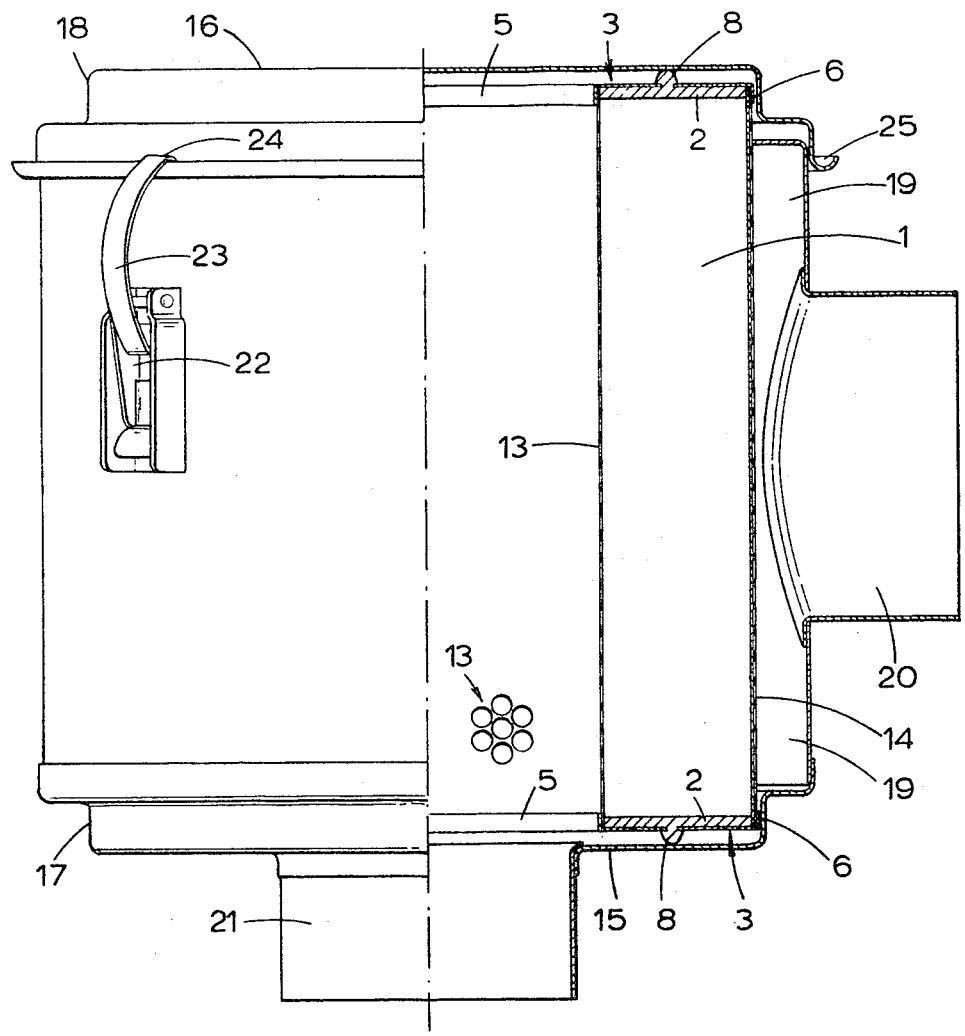

3,395,208
**METHOD FOR MAKING FILTER AND
END CAP ASSEMBLY**
Stanley Paul Witchell, Llanfoist, Abergavenny, England,
assignor to Coopers Mechanical Joints Limited, Llanfoist Works, Abergavenny, Monmouthshire, England,
a company of Great Britain
Filed June 30, 1966, Ser. No. 561,855
Claims priority, application Great Britain, July 15, 1965,
30,194/65
1 Claim. (Cl. 264—261)

ABSTRACT OF THE DISCLOSURE

A filter element and end cap assembly are mounted within a casing for filtering fluids which pass through the casing. A gasket is molded integral with the end cap of said assembly and forms a seal between the filter element and the casing. An annular, multiapertured, channel-shaped base plate is interposed between the gasket and the end cap to form a rigid assembly. In an alternative embodiment, the base plate takes the form of a pair of annular angle members spaced apart to form a gap therebetween. The filtering material, the base plate, gasket, and the end cap define a unitary combination.

---

This invention relates to filters for fluid, such as oil filters and, in particular, filters for removing dust from the air entering internal combustion engines. The type of filter with which the invention is concerned is that in which the fluid passes through a tubular wall of filtering material moulded at its ends into caps. Such a filter element is mounted in a casing which is sealed to the end caps so as to prevent the fluid from passing round the ends of the filtering material without passing therethrough. At least one of the end caps has a central opening to enable the fluid to pass out of or into the space within the tubular wall. This wall, which is usually of impregnated paper, gauze or reinforced felt, is generally formed into longitudinal pleats so that it presents a zig-zag formation in cross-section.

It is common practice to form each end cap from polyvinyl chloride and, in cases where extra strength is required, the cap is furnished with a dish-shaped or channel-shaped metal reinforcement that fits over the plastic cap. This involves the provision of a separate rubber gasket that has to be fixed to the outer metal face to provide a proper seal with the casing in which the filter element is mounted. An object of the present invention is to provide a more economical and reliable method of constructing such an assembly.

According to the invention, a filter element of the kind in which the fluid to be filtered passes through a tubular wall of filtering material moulded at its ends into caps, is provided with an end cap assembly including an annular synthetic plastic cap into which one end of the tubular wall is moulded, a ring-shaped, synthetic plastic gasket integral with the plastic end cap on the face thereof remote from the tubular wall and shaped so as to enable a secure joint to be made between the filter element and a casing in which the filter element is mounted, and a metal reinforcing ring coextensive with a substantial area of the annular cap. Conveniently the metal reinforcing ring may be a shallow dish or channel-shaped member into which the plastic cap fits and formed with apertures through which the gasket is united to the end cap or alternatively this reinforcement may be divided so as to form a circular gap through which the gasket projects from the cap.

Very advantageously the plastic material may be polyurethane and in forming an end cap and gasket of this material, a mould may be used which is formed with a recess, into which the metal reinforcement is fitted, and with a groove, corresponding to the shape of the gasket, opening into the recess. The liquid mixture comprising the catalyst and basic polymer necessary for the formation of the polyurethane unit is dispensed into the recess and groove.

In order that the invention may be clearly understood and readily carried into effect, a filter element in accordance therewith, a method of making this filter element, and a unit incorporating the filter element, will now be described, by way of example, with reference to the accompanying drawings, in which:

FIGURE 4 is an elevation, partly in section, of a filter unit containing the element of FIGURE 1.

Figure 1:
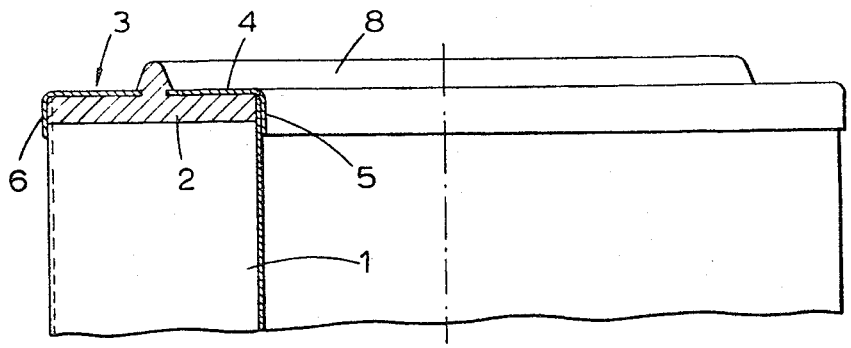
FIGURE 1 is an elevation, partly in section, of one end of the filter element.

The filter element of FIGURE 1 includes the well known type of tubular, impregnated paper filter 1 having a wall formed all around its periphery into longitudinal pleats. Each end of this filter 1 is moulded into an annular, polyurethane end cap 2 which itself is moulded into a channel-shaped metal reinforcing ring 3 having a base plate 4 and sides 5, 6. The annular base plate 4 is formed with a ring of holes 7 (FIGURE 2), and through these holes the cap 2 is united to a circular, polyurethane gasket 8 to provide a seal with the top or bottom of the casing in which the element is mounted when in use.

Figure 3:
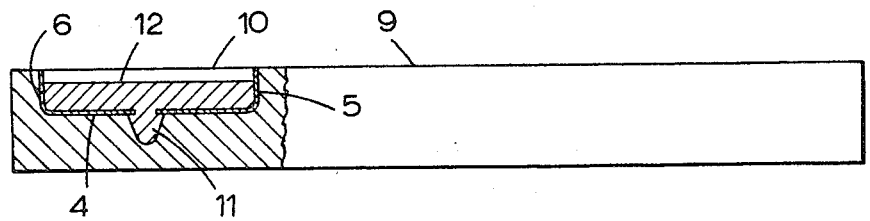
FIGURE 3 is an elevation, partly in section, of a mould containing material for forming a portion of the filter element of FIGURE 1.

In order to form the ends of the filter element, a mould 9 (FIGURE 3) is made use of. This is formed with an annular recess 10 into which the reinforcement 3 is fitted. The bottom of the recess 10 is formed with a circular groove 11 in which the gasket 8 is moulded and which is slightly wider than the diameter of the holes 7. A liquid mixture comprising the catalyst and basic polymer that form polyurethane is then dispensed into the recess 10 so that it finds its way through the holes 7 into the groove 11, care being taken to avoid occluded air. The liquid rises through the holes 7 and fills the reinforcement 3 up to the level 12, which is that required to provide a cap 2 of the desired thickness. Before the liquid has had time to gel, the end of the paper filter is fitted into the reinforcement 3. The liquid then solidifies to a "rubbery" consistency at room temperature and pressure and securely grips the end of the filter 1.

In a modification the reinforcement 3 is divided into two separate angle sections, the gap between them being slightly less than the width of the top of the groove 11, so that the gasket 8 is united round its entire circumference to the cap 2 and the angle sections are made more secure.

Figure 2:
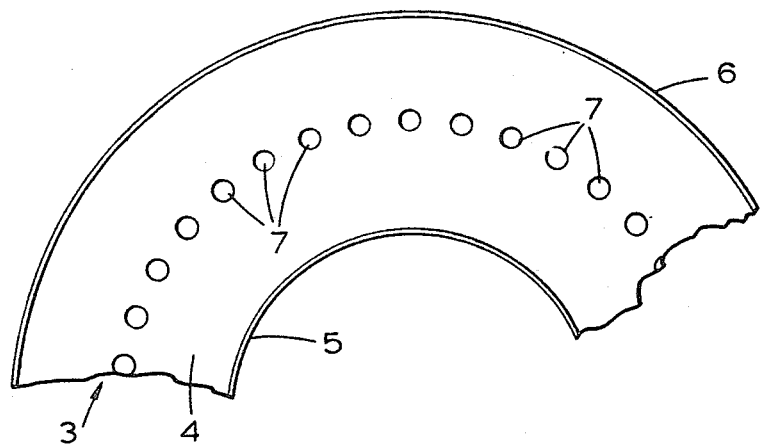
FIGURE 2 is a plan as viewed from below of a part of the filter element of FIGURE 1.

FIGURE 4 shows a filter unit containing the filter element of FIGURES 1 and 2 when slightly modified by the addition of perforated metal tubes 13, 14 to give support to the paper filter 1, as is necessary in some circumstances. The tubes 13, 14, which respectively make contact with the inner and outer peripheries of the filter 1, have their ends inserted into the reinforcing rings 3 with the ends of the filter 1.

The unit comprises a metal casing having an end wall 15 against which one gasket 8 bears, and a removable lid 16, against which the other gasket 8 bears, at the other end. The casing is circular in plan and is formed at the end remote from the lid with a shoulder 17 that centres the adjacent end of the filter element. The lid 16 is formed with a similar shoulder 18 for the same purpose. Between the shoulders 17, 18 is an annular space 19 into which air to be filtered enters through a duct 20. After passing through the filter element to the space within the tube 13, the air is drawn through a central outlet duct 21 connected to the air inlet of an internal combustion engine.

To ensure that the air does not leak round the ends of the filter element, the two gaskets 8 are pressed tightly against the wall 15 and lid 16 by the action of four toggle linkages 22, distributed equidistantly around the casing, only one being shown in FIGURE 4. When the lid 16 is being made secure, each toggle linkage 22 is manually actuated to pull downwards a curved resilient leaf spring 23 having a hook 24 that engages over an upturned flange 25 on the lid 16 to pull the lid tightly against the filter element.

I claim:

1. A method for making a filter and end cap assembly which includes a tubular wall of pleated filtering material retained within a casing, said method comprising the steps of:

arranging a pair of annular angle members spaced apart in an annular mold having a circular groove in the base thereof so as to define a channel-shaped ring having a gap defined by said angle members superposed over said circular groove and said gap is of width less than the groove width, pouring a liquid mixture comprising the catalyst and basic polymer required to form polyurethane into said ring to fill the groove and gap and at least a portion of the channel, placing the end of the tubular wall of the pleated filtering material into the channel such that the end of the tubular wall is imbedded in the liquid mixture, and causing the solidification of the said liquid mixture to secure the wall within the channel.

References Cited

UNITED STATES PATENTS

| 2,415,372 | 2/1947 | Salt et al. | 55—498 X |
| 2,732,031 | 1/1956 | Rabbitt et al. | 55—502 X |
| 2,941,620 | 6/1960 | Thornburgh | 55—498 |
| 2,962,121 | 11/1960 | Wilber | 55—498 X |
| 2,979,159 | 4/1961 | Pritchard et al. | 55—498 X |
| 3,111,488 | 11/1963 | Casaleggi | 210—493 |
| 3,190,058 | 6/1965 | Farr et al. | 55—498 X |
| 3,235,633 | 2/1966 | Holloway | 55—502 X |
| 3,038,211 | 6/1962 | Luedi | 264—273 X |

FOREIGN PATENTS 1,113,686 12/1955 France.

REUBEN FRIEDMAN, *Primary Examiner.*

C. DITLOW, *Assistant Examiner.*